United States Patent [19]

Finfrock et al.

[11] Patent Number: 4,787,028
[45] Date of Patent: Nov. 22, 1988

[54] MULTICOMMUNICATION PROTOCOL CONTROLLER

[75] Inventors: Don C. Finfrock; Donald J. Girard, both of Cambridge, Ohio

[73] Assignee: NCR Corporation, Dayton, Ohio

[21] Appl. No.: 772,225

[22] Filed: Sep. 3, 1985

[51] Int. Cl.⁴ .......................... G06F 3/00; G06F 15/20
[52] U.S. Cl. ..................................... 364/200; 364/900
[58] Field of Search ............... 364/300, 200 MS File, 364/900 MS File

[56] References Cited

U.S. PATENT DOCUMENTS

| | | | |
|---|---|---|---|
| 4,079,452 | 3/1978 | Larson et al. | 364/200 |
| 4,138,718 | 2/1979 | Toke et al. | 364/200 |
| 4,200,915 | 4/1980 | Struger et al. | 364/900 |
| 4,207,609 | 6/1980 | Luiz et al. | 364/200 |
| 4,241,398 | 12/1980 | Carll | 364/200 |
| 4,245,306 | 1/1981 | Besemer | 364/200 |
| 4,261,033 | 4/1981 | Lemay | 364/200 |
| 4,281,315 | 7/1981 | Bauer et al. | 364/200 |
| 4,335,426 | 6/1982 | Maxwell et al. | 364/200 |
| 4,336,588 | 6/1982 | Vernon et al. | 364/200 |
| 4,363,093 | 12/1982 | Davis et al. | 364/200 |
| 4,365,295 | 12/1982 | Katzman et al. | 364/200 |
| 4,410,961 | 10/1983 | Dlugos et al. | 364/900 |
| 4,410,983 | 10/1983 | Cope | 364/200 |
| 4,428,043 | 1/1984 | Catiller et al. | 364/200 |
| 4,466,079 | 8/1984 | Daniels et al. | 364/900 |
| 4,493,021 | 1/1985 | Agrawal et al. | 364/200 |
| 4,493,051 | 1/1985 | Brezzo et al. | 364/900 |
| 4,513,370 | 4/1985 | Ziv et al. | 364/200 |
| 4,530,051 | 7/1985 | Johnson et al. | 364/200 |
| 4,539,655 | 9/1985 | Trussell et al. | 364/900 |
| 4,562,533 | 12/1985 | Hodel et al. | 364/200 |
| 4,580,239 | 4/1986 | Greenhill et al. | 364/900 |
| 4,583,195 | 4/1986 | Daniels et al. | 364/900 |
| 4,586,134 | 4/1986 | Norstedt | 364/200 |
| 4,589,063 | 5/1986 | Shah et al. | 364/200 |
| 4,649,473 | 3/1987 | Hammer et al. | 364/200 |
| 4,688,170 | 8/1987 | Waite et al. | 364/200 |

OTHER PUBLICATIONS

Patents Abstracts of Japan, vol. 6, No. 104 (P-122) (982), Jun. 15, 1982, & JP, A, 5736340 (Fujitsu) (Feb. 27, 1982).
WO, A, 82/03285 (Mackey) Sep. 30, 1982, see p. 5, lines 23-24; p. 12, lines 12-19; p. 14, 15, lines 1-5, p. 19, lines 1-21; figures 1,2.
EDN Electrical Design News, vol. 25, No. 3, Feb. 1980, (Denver, U.S.), Bonney: "For uP-System Data Entry, Thumbwheel Switches Excel", pp. 161-165, see p. 163, figure 4; p. 164, figure 5.

Primary Examiner—Eddie P. Chan
Assistant Examiner—Viet Q. Nguyen
Attorney, Agent, or Firm—Wilbert Hawk, Jr.; Albert L. Sessler, Jr.; Richard W. Lavin

[57] ABSTRACT

A data processing system which includes a host processor and a plurality of remote processing devices which are coupled to a common communication channel. The system also includes a look-up table storing the sets of instructions for a plurality of communication protocols for use with the remote processing device and a controller associated with one of the remote processing devices. A selectively actuated switch member located in the controller provides an address for the controller. During a power-up operation, the controller address is transmitted to the host processor for use in addressing the look-up table to obtain the communication protocol for the controller. This information is then loaded into the controller for controlling the transfer of data between the host processor and the remote processing device.

8 Claims, 5 Drawing Sheets

MULTICOMMUNICATION PROTOCOL CONTROLLER

BACKGROUND OF THE INVENTION

The present invention is directed to a data processing system and more particularly to a local area network communication system which includes a plurality of remote processing devices connected to a common communication channel for transferring data between the processing devices and a host processing device, which each remote processing device may operate under a different communication protocol.

With the advent of low cost data processing devices such as personal computers, point-of-sale data terminal devices, etc., local communication networks have been developed to handle a large number of processing devices that may be used within a local business environment. In prior data processing systems, because of the complexity of the communication protocol associated with each processing device, a single communication protocol was utilized for each data processing system. Thus, if a processing device is added to a processing system after it had been installed and in operation, such processing device would have been required to operate with the same communication protocol as that of the other processing devices in the system. This restriction has limited the sales appeal of such data processing system.

It is therefore the principal object of this invention to provide a processing system which can accommodate a plurality of remote processing devices each of which can operate under a different communication protocol.

It is a further object of this invention to provide a system for selecting the communication protocol associated with each of the processing devices found in a data processing system.

SUMMARY OF THE INVENTION

In order to fulfill these objects, there is disclosed a local area network processing system in which a plurality of remote processing devices such as point-of-sale data terminals are connected to a host processor over a communication channel. Associated with each of the data terminal devices is a communication controller on which is mounted a rotary switch member which is selectively set to output binary signals comprising the address of the controller. When a power-up condition occurs for the system, each controller will send a message including its address to the host processor identifying the controller. The host processor, using the address of the controller as an address, will retrieve from a look-up table stored in the processor the program instructions comprising the communication protocol which will be used by the controller in controlling the transfer of data between the host processor and the remote processing devices. The instructions are loaded into a RAM memory located within the controller. The address switch is manually set so that each controller will have a different address.

BRIEF DESCRIPTION OF THE DRAWINGS

Additional advantages and features of the present invention will become apparent and fully understood from the reading of the following description, taken together with the annexed drawings, in which.

DESCRIPTION OF THE PREFERRED EMBODIMENT

Figure 1:
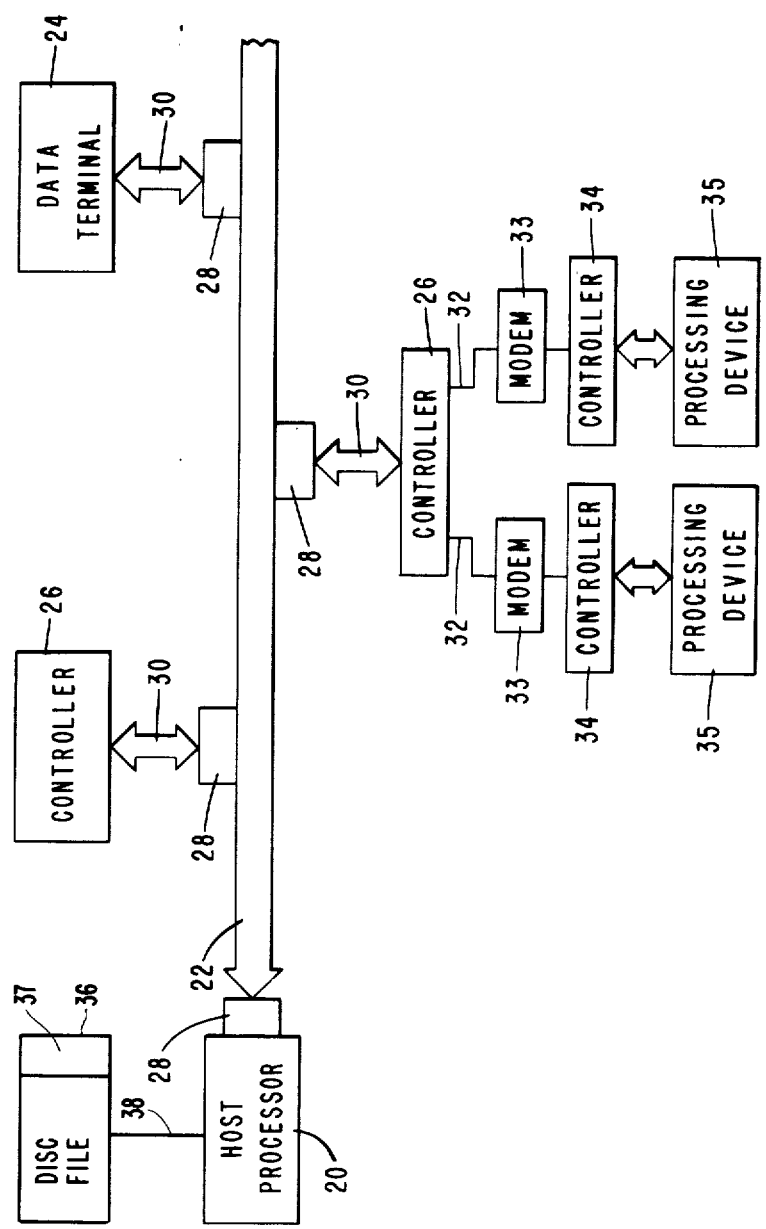
FIG. 1 is a block diagram of a data processing system in which the present invention is incorporated.

Referring now to FIG. 1, there is shown a block diagram of a data processing system in which a host processor 20 is coupled over a communication channel or link 22 to a plurality of remote processing devices wich may include a data terminal device 24 and a communication controller 26 which controls the transfer of data between the terminal device 24 and the host processor 20. The controller 26, the processor 20 and the terminal device 24 are each connected to the channel 22 through a tap box 28 and a bus 30. As will be described more fully hereinafter, each of the controllers 26 is capable of being coupled over communication lines 32 through modems 33 or directly to a remote controller 34 which in turn controls the transferring of data between the host processor 22 and processing devices such as data terminal devices 35 connected to the remote controller 34. A disk file memory 36 connected to the host processor 20 over line 38 includes a look-up table 37 which contains a plurality of programs associated with different types of communication protocol such as A sync, bisync and bit sync that are used by the remote processing devices in transferring data over the channel 22. For a complete description of the different types of communication protocols, reference should be made to U.S. Pat. No. 4,346,440 issued Aug. 25, 1982.

Figure 2:
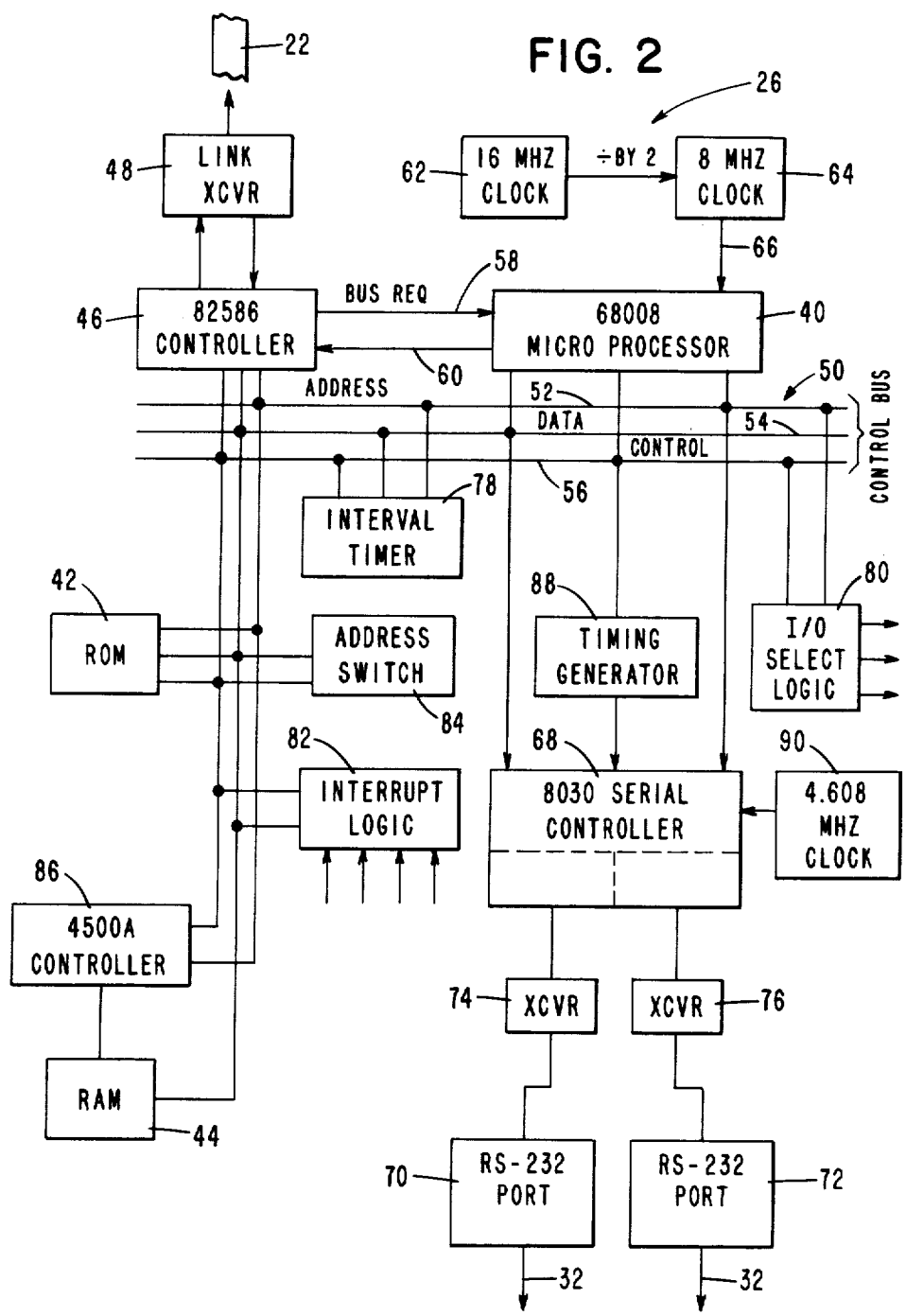
FIG. 2 is a block diagram of the communication controller of the present invention which is found in the data processing system.

Referring now to FIG. 2, there is shown a block diagram of the controller 26. Included in the controller is a Motorola 68008 microprocessor 40 which is commercially available from the Motorola Corporation of Phoenix, Ariz. The microprocessor 40 is supported by a 32K ROM memory 42 and a 32K dynamic ram memory 44. An Intel 82586 controller device 46 which is commercially available from the Intel corporation of Santa Clara, Calif., interfaces the controller 26 through a link transceiver 48 to the communication channel 22. The controller 46 also interferes with a local control bus generally indicated by the numeral 50 which includes an address line 52, a data line 54 and a control line 56. The controller 46 is also connected to the microprocessor 40 over the bus request line 58 and the bus granted line 60. The clock generators 62 and 64 supply 8 Mhz clock signals over line 66 to the microprocessor 40.

Further included in the controller 26 is a Zilog Z8030 serial controller 68 which controls the transfer of data through transceivers 74 and 76, and over a pair of RS-232 ports, and over lines 32 to the remote controllers 34 (FIG. 1). The serial controller 68 is commercially available from the Zilog Corporation of Santa Clara, Calif. The lines 32 are normally connected to the controllers 34 for use in transferring data between the controller 68 and the processing devices associated with the controllers 34 in a manner that is well known in the art. The controller 68 is capable of supporting a large variety of communication protocols such as SDLC/HDLC, asynchronous data formats, and all RS232 type synchronous formats including character, byte and bit oriented protocols. Further included in the controller 26 is interval timer 78, an I/O select logic circuit 80, an interrupt logic circuit 82 and an address switch 84, the details of which will be described more fully hereinafter. Associated with the RAM memory 44 is a Texas Instrument TWS4500A controller 86 while a timing generator 88 and a 4.608 MHZ clock source 90 are associated with the serial controller 68. The controller 86 is commercially available from the Texas Instrument Corporation of Dallas, Tex.

Figure 3:
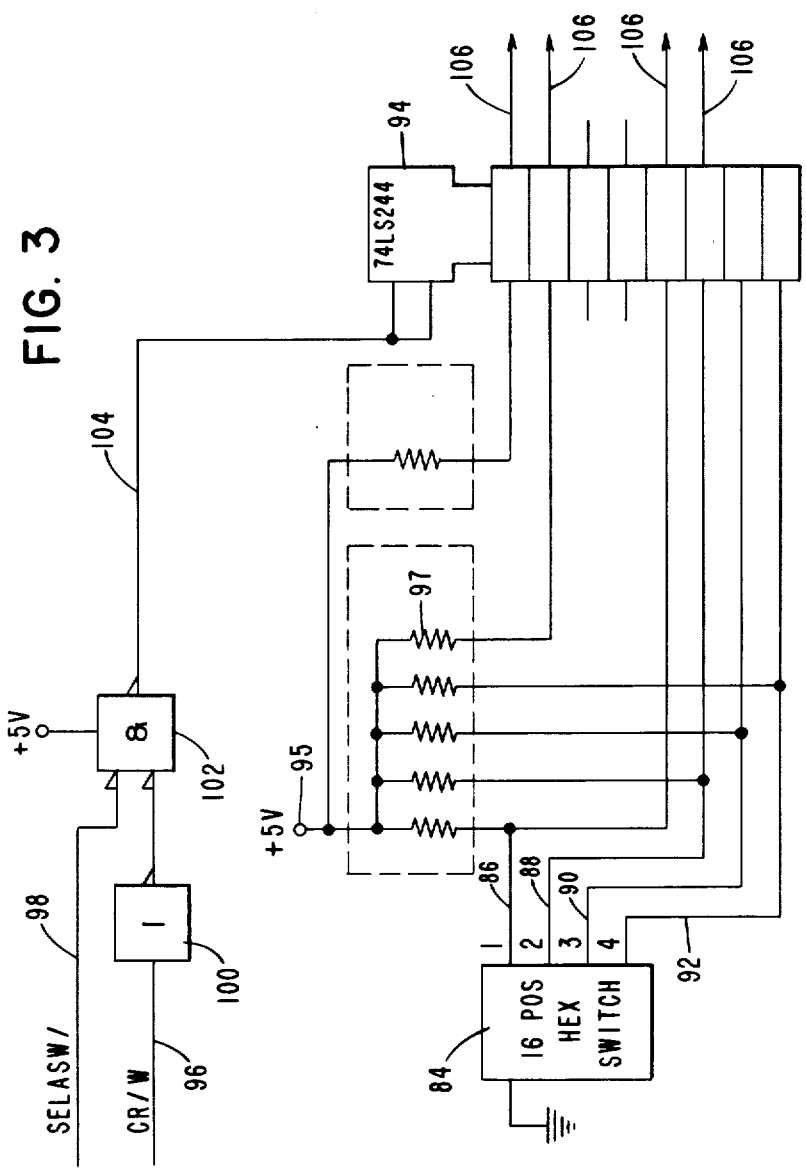
FIG. 3 is a schematic representation of the rotary switch mounted on the controller for generating binary signals representing the address of the controller.

Referring now to FIG. 3, there is shown a schematic diagram of the address switch 84 (FIG. 2). The switch 84 comprises a 16 position hexadecimal rotary switch which is manually set to provide the address of a controller 26. The switch 84 is commercially available from ALPS USA of Rockville Center, N.Y. as Part No. SRQH010. The setting of the switch 84 results in a four bit binary word, representing the address of a selected controller 26, appearing on the output lines 86-92 inclusive of the switch which is transmitted to a 74LS244 buffer member 94. The binary signals for each of the output lines are derived from a 5-volt power source 95 applied through a pull-up resistor 97. The buffer member 94 is enabled by the signal CR/W appearing on the control line 96 of the control bus 50 (FIG. 2) and the signal SELASW/appearing on the control line 98. These signals are outputted by the microprocessor 40 and the I/O select logic circuit 80 respectively. When the signal SELASW/is low, the buffer member 94 will be enabled to output on lines 106 the binary signals applied to the buffer 94 on input lines 86-92 inclusive, upon the signal CR/W going high. The signal CR/W is transmitted through an inverter gate 100 and into one input of an AND gate 102 which also receives the signal SELASW/on line 98. The AND gate 102 will output a control signal over line 104 to the buffer 94, enabling the buffer to output the binary signals appearing on input lines 86-92 inclusive over the output lines 106 to the microprocessor 40.

Figure 4:
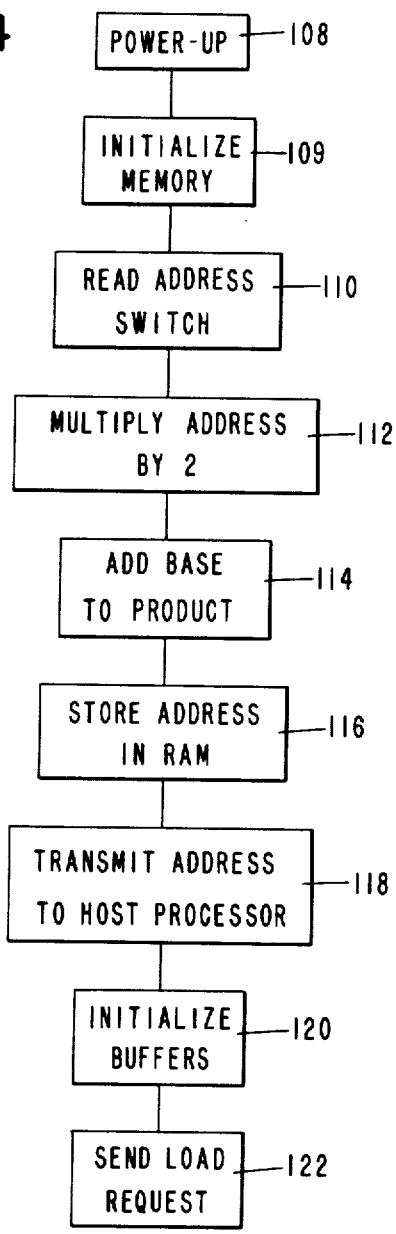
FIG. 4 is a flow chart of some of the events which occur during the power-up operation of the controller of the present invention.

Referring now to FIG. 4, there is shown a flow diagram of the events which occur during a power-up operation of the controller 26. Upon the application of power (block 108) to the controller 26, the microprocessor 40 will initialize the memory 44 (block 109) and read (block 110) the binary signals appearing on the output lines 106 (FIG. 3) of the buffer 94. The microprocessor 40 will then multiply the address value read by two (block 112) and add the base of 190 to the product (block 114) to obtain an address identifying the selected controller 26. The microprocessor 40 will then store the address in the RAM memory 44 (block 116) and the controller 46 then transmit the address (block 118) as part of an identification message to the host processor 20. The microprocessor 40 will then initialize buffers (not shown) in the RAM memory 44 (block 120) preparatory to receiving the data from the host processor, which data includes the communication protocol for the selected controller 26. After the buffers in the RAM memory 44 have been initialized, the microprocessor 40 will send a message to the host processor 20 requesting (block 122) data for use in its operation.

The host processor 20, during a power-up operation (block 124) (FIG. 5), will wait until it receives a power-up message (block 126) from the controller 26 identifying the controller, which message includes the controller address. The host processor 20 will then store the power-up message including the address (block 128) in a RAM memory located in the processor (not shown) and wait (block 130) until it receives a message from the controller 26 requesting a load message. By sending this request, the controller 26 indicates that the RAM memory 44 (FIG. 2) is ready to receive the load data. The host processor 20 then retrieves the controller address from its storage in memory, and using this address to address the table 37 (FIG. 1), located in the processor 20, will obtain the communication protocol instructions (block 132) stored in the look-up table 37 assigned to the controller 26. The processor then sends a message (block 134) to the controller 26 indicating that it is ready to download the data. After receiving an acknowledge message (block 136) from the controller indicating that it is ready to receive the data, the host processor 20 proceeds to transmit the data message including the instructions for the particular communication protocol (block 138) assigned to the controller 26 to the controller where it is stored in the RAM memory 44 (FIG. 2). This procedure will be repeated with respect to any communication controller that is coupled to the host processor 20.

Figure 5:
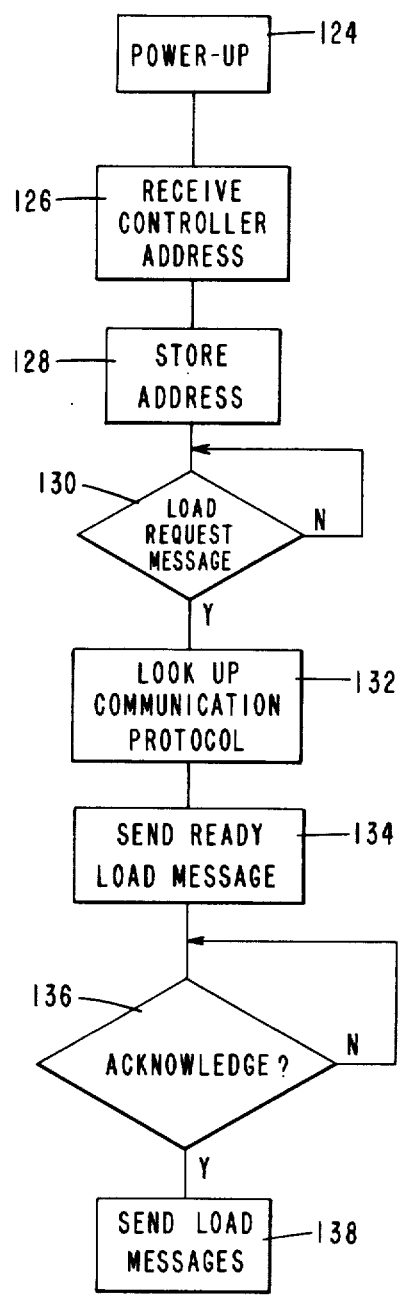
FIG. 5 is a flow chart of some of the events which occur during a power-up operation of the host processor of the present invention.

The following comprises a detailed program listing for the transfer of the communication protocol to the controller shown in FIGS. 4 and 5. The actual machine codes and instructions shown relate to the Motorola 68008 microprocessor chip in the embodiment described, however the techniques employed herein may be extended to other processors. Definition of the various machine codes and instructions may be obtained from, for example, the publications entitled "Motorola MC68008, 16 Bit Processor with 8 Bit Data Bus", and "Motorola MC68008-UM, 16 Bit Microprocessor User Manual-3rd Ed.", published by Prentice-Hall, Inc. in 1982.

| Lines | Address | Object | Assembly Level Code |
|-------|---------|--------|---------------------|
| 3098 | 1 00000302 | | CCINTLD: |
| 3101 | 1 00000302 | 48E78000 | MOVEM.L D0,-(SP) |
| 3102 | 1 00000306 | 4280 | CLR.L D0 |
| 3103 | 1 00000308 | 102C002A | MOVE.B O.TEDA(A4),D0 |
| 3104 | | | IF.B D0 <NE> #$FD THEN.S |
| 3105 | 1 00000312 | 4CDF0001 | MOVEM.L (SP)+,D0 |
| 3106 | 1 00000316 | 40E7 | MOVE.W SR,-(SP) |
| 3111 | 1 00000318 | 46FC2700 | MOVE.W #$2700,SR |
| 3112 | 1 0000031C | 13FC00C00001 0712 | MOVE.B #SCO,A.SCRB+WR9 |
| 3118 | 1 00000324 | | CALL ACKIT |
| 3126 | 1 0000032A | 377C902B000A | MOVE.W #CGEABORT,O.MSTA(A5) |

-continued

| Lines | Address | Object | Assembly Level Code |
|---|---|---|---|
| 3127 | 1 00000330 | 377C00040002 | MOVE.W #WDRESP,KO.TCON(A3) |
| 3128 | 1 00000336 | 08AA00060008 | BCLR.B #6,0.IBBD+O.BDCNT(A2) |
| 3129 | 1 0000033C | 46DF | MOVE.W (SP)+,SR |
| 3130 | 1 0000033E | 201F | MOVE.L (SP)+,D0 |
| 3131 | 1 00000340 | 60B0 | BRA.S INVOWNER |
| 3137 | 1 00000344 | 4CDF0001 | MOVEM.L (SP)+,D0 |
| 3138 | 1 00000348 | 48E78040 | MOVEM.L D0/A1,−(SP) |
| 3139 | 1 0000034C | 23FC00000001 0003FA30 | MOVE.L #1,A.SEQN0 |
| 3140 | 1 00000356 | 357C802A0008 | MOVE.W #($8000+PUMSGE−PUMSG),0.IBBD+O.BDCNT (A2) |
| 3142 | 1 0000035C | 357C0000000A | MOVE.W #O,0.IBBD+0.BDLNK(A2) |
| 3143 | 1 00000362 | 266A000C | MOVE.L O.IBBD+O.BDBA(A2),A3 |
| 3144 | 1 00000366 | 377C00040002 | MOVE.W #WDRESP,O.TCON(A3) |
| 3145 | 1 0000036C | 177C00010007 | MOVE.B #CC.INTLD,O.CMND(A3) |
| 3146 | 1 00000372 | 377C0000000A | MOVE.W #CGECOOD,O.MSTA(A3) |
| 3147 | 1 00000378 | 377C00E000C | MOVE.W #(PUMSGE−PUMSG−O.MDAT),O.MVLI(A3) |
| 3148 | 1 0000037E | 43F90003FDAC | LEA PUMSG,A1 |
| 3149 | | | FOR D0−#0.TCON TO #(PUMSGE−PUMSG−O.MDAT),D0.S |
| 3150 | 1 0000038A | 17B1081C081C | MOVE.B O.MDAT(A1,D0.L),O.MDAT(A3,D0.L) |
| 3151 | | | ENDF |
| 3153 | 1 00000398 | 4CDF0201 | MOVEM.L (SP)+,D0/A1 |
| 3157 | | | ENDI |
| 3159 | 1 0000039C | | RETURN |
| 3184 | 1 000003A0 | | CCLOAD: |
| 3185 | 1 000003A0 | 48E7E0C0 | MOVEM.L A0/A1/D0/D1/D2,−(SP) |
| 3186 | 1 000003A4 | 2F0A | MOVE.L A2,−(SP) |
| 3187 | 1 000003A6 | 4280 | CLR.L D0 |
| 3188 | 1 000003A8 | 102C002A | MOVE.B O.TEDA(A4),D0 |
| 3195 | | | OF.B D0 <EQ> #$FD AND O.MDAT(A3) <EQ> #1 |
| 3196 | 1 000003BA | 196C002D002A | MOVE.B O.TEDASA+1(A4),O.TEDA(A4) |
| 3197 | 1 000003C0 | 13EC002D0003 FA70 | MOVE.B O.TEDASA+1(A4),O.TEDA(A4) |
| 3198 | 1 000003C8 | 222B0034 | MOVE.L O.ETYP+0.MDAT(A3),D1 |
| 3199 | 1 000003CC | D2B90003FF16 | ADD.L A.LMEMA,D1 |
| 3200 | 1 000003D2 | 068100000300 | ADD.L #CGESTKZ,D1 |
| 3201 | 1 000003D8 | 23CD10003FA2C | MOVE.L D1,A.ETYP |
| 3202 | 10000003DE | 33FC000000003 | MOVE.W #O,0.RAMCRC+A.TRLTE |
| 3203 | 1 000003E6 | 41EC009C | LEA O.TETRBR(A4),A0 |
| 3204 | 1 00000EA | | CALL CANCELIM |
| 3205 | 1 000003F0 | 6000009A | BRA.L GOODLOAD |
| 3206 | | | ELSE.S |
| 3207 | 1 000003F6 | 102C002D | MOVE.B O.TEDASA+1(A4),D0 |
| 3208 | | | IF.B D0 <NE> A.OWNER THEN.S |
| 3209 | 1 00000402 | 377C933000A | MOVE.W #CGENOOWN,O.MSTA(A3) |
| 3210 | 1 00000408 | 426B001C | CLR.W O.MDAT(A3) |
| 3211 | 1 0000040C | 60000094 | BRA.L ABORTLD |
| 3212 | | | ENDI |
| 3213 | | | ENDI |
| 3214 | 1 00000410 | 4280 | CLR.L D0 |
| 3215 | 1 00000412 | 302B001C | MOVE.W O.MDAT(A3),D0 |
| 3216 | 1 00000416 | 22390003FA30 | MOVE.L A.SEQNO,D1 |
| 3217 | 1 0000041C | B280 | CMP.L D0,D1 |
| 3218 | 1 0000041E | 662C | BNE.S BADLOAD |
| 3219 | 1 00000420 | 41EB001E | LEA O.MDAT+2(A3),A0 |
| 3223 | 1 00000424 | 22790003FF16 | MOVE.L A.LMEMA,A1 |
| 3224 | 1 0000042A | D3FC00000300 | ADD.L #CGESTKZ,A1 |

-continued

| Lines | Address | Object | Assembly Level Code |
|---|---|---|---|
| 3225 | 1 00000430 | 5580 | SUB.L #2,D0 |
| 3226 | 1 00000432 | C0FC0100 | MULU #256,D0 |
| 3227 | 1 00000436 | D3C0 | ADD.L D0,A1 |
| 3231 | 1 00000438 | 2009 | MOVE.L A1,D0 |
| 3232 | 1 0000043A | 4282 | CLR.L D2 |
| 3233 | 1 0000043C | 342B000C | MOVE.W 0.MVLI(A3),D2 |
| 3234 | 1 00000440 | D480 | ADD.L D0,D2 |
| 3235 | 1 00000442 | 5582 | SUB.L #2,D2 |
| 3236 | | | IF.L D2 <GE> A.ELDSA THEN.S |
| 3237 | 1 0000044C | | BADLOAD: |
| 3238 | 1 0000044C | 377C9032000A | MOVE.W #CGEOUTSQ,0.MSTA(A3) |
| 3239 | 1 00000452 | 377C00040002 | MOVE.W #WDRESP,0.TCON(A3) |
| 3240 | 1 00000458 | 20390003FA30 | MOVE.L A.SEQNO,D0 |
| 3241 | 1 0000045E | 3740001C | MOVE.W D0,O.MDAT(A3) |
| 3242 | 1 00000462 | 6044 | BRA.S FINLOAD |
| 3243 | | | ELSE.S |
| 3244 | 1 00000466 | 4281 | CLR.L D1 |
| 3245 | 1 00000468 | 3322B000C | MOVE.W O.MVLI(A3),D1 |
| 3246 | 1 0000046C | 5581 | SUB.L #2,D1 |
| 3250 | | | FOR.L D0=#1 TO D1 DO.S |
| 3251 | 1 00000472 | 2449 | MOVE.L A1,A2 |
| 3252 | 1 00000474 | 4244 | CLR.W D4 |
| 3253 | 1 00000476 | 1810 | MOVE.B (A0),D4 |
| 3254 | 1 00000478 | | CALL CRC |
| 3255 | 1 0000047E | 33C50003FF80 | MOVE.W D5,A.TRLTE+O.RAMCRC |
| 3256 | 1 00000484 | 12D8 | MOVE.B (A0)+,(A1)+ |
| 3257 | | | ENDF |
| 3258 | 1 0000048C | | GOODLOAD: |
| 3259 | 1 0000048C | 20390003FA30 | MOVE.L A.SEQNO,D0 |
| 3260 | 1 00000492 | 3740001C | MOVE.W D0,O.MDAT(A3) |
| 3261 | 1 00000496 | 52B90003FA30 | ADD.L #1,A.SEQNO |
| 3262 | 1 0000049C | 377C0000000A | MOVE.W #CGEGOOD,O.MSTA(A3) |
| 3263 | 1 000004A2 | | ABORTLD: |
| 3264 | 1 000004A2 | 377C00040002 | MOVE.W #WDRESP,O.TCON(A3) |
| 3265 | | | ENDI |
| 3266 | 1 000004A8 | | FINLOAD: |
| 3267 | 1 000004A8 | 377C0002000C | MOVE.W #2,O.MVLI(A3) |
| 3268 | 1 000004AE | 245F | MOVE.L (SP)+,A2 |
| 3269 | 1 000004B0 | 357C801E008 | MOVE.W #($8000+O.MDAT+$2),O.IBBD+O.BDCNT(A2) |
| 3270 | 1 000004B6 | 4CDF0307 | MOVEM.L (SP)+,A0/A1/D0/D1/D2 |
| 3271 | 1 000004BA | | RETURN |
| 3294 | 1 000004BE | | CCEOL: |
| 3295 | 1 000004BE | 48E7C0A0 | MOVEM.L A0/A2/D0/D1,−(SP) |
| 3299 | | | FOR.L D0=#O.TCON TO #O.MDAT DO.S |
| 3300 | 1 000004C6 | 17BC00000800 | MOVE.B #0,0(A3,D0.L) |
| 3301 | | | ENDF |
| 3302 | 1 000004D6 | 357C801C008 | MOVE.W #($8000+O.MDAT),O.IBBD |
| 3303 | 1 000004DC | 177C00040007 | MOVE.B #CC.EOL,O.CMND(A3) |
| 3304 | 1 000004E2 | 20390003FA30 | MOVE.L A.SEQNO,D0 |
| 3305 | 1 000004E8 | 22390003FF16 | MOVE.L A.LMEMA,D1 |
| 3306 | 1 000004EE | 068100000300 | ADD.L #CGESTKZ,D1 |
| 3307 | 1 000004F4 | 5580 | SUB.L #2,D0 |
| 3309 | 1 000004F6 | C0FC0100 | MULU #256,D0 |
| 3310 | 1 000004FA | D081 | ADD.L D1,D0 |
| 3311 | 1 000004FC | 23C00003FA34 | MOVE.L D0,A.ELOAD |
| 3312 | 1 00000502 | 377C00040002 | MOVE.W #WDRESP,O.TCON(A3) |
| 3316 | 1 00000508 | 48E7FFFE | MOVEM.L A0−A6/D0−D7,(SP) |
| 3317 | 1 0000050C | 20790003FA2C | MOVE.L A.ETYP,A0 |
| 3318 | 1 00000512 | | CALL 0(A0) |
| 3320 | 1 00000514 | 4CDF7FFF | MOVEM.L (SP)+,A0−A6/D0−D7 |
| 3321 | | | IF.W A.TASKST <NE> #0 THEN.S |
| 3322 | | | IF.B A.CHANST+O.CHANA <NE> |
| 3326 | 1 0000052C | 13FC00000003 FF2C | MOVE.B #0,A.CHANST+O.CHANA |

-continued

| Lines | Address | Object | Assembly Level Code |
|---|---|---|---|
| 3327 | | | ENDI |
| 3328 | | | IF.B A.CHANST+O.CHANB <NE> |
| 3329 | 1 0000053E | 13FC00000003 FF2D | MOVE.B #0,A.CHANST+O.CHANB |
| 3330 | | | ENDI |
| 3331 | | | ENDI |
| 3335 | 1 00000546 | 37790003FF2A 000A | MOVE.W A.TASKST, O.MSTA(A3) |
| 3339 | 1 0000054E | 41EC00B0 | LEA O.TETRBH(A4),A0 |
| 3340 | 1 00000552 | | CALL STARTTM |
| 3344 | 1 00000558 | 42390003FF83 | CLR.B A.TRLTE+O.UPDAT+1 |
| 3345 | 1 0000055E | 33F90003FF80 0003FA4E | MOVE.W A.TRLTE+ O.RAMCRC,A.CRCRAM |
| 3346 | 1 00000568 | 42790003FF80 | CLR.W A.TRLTE+O.RAMCRC |
| 3347 | 1 0000056E | 08F900090003 FFEC | BSET.B #BN.CRC,A.SFLA+2 |
| 3349 | 1 00000576 | RCDF0503 | MOVEM.L (SP)+,A0/A2/D0/D1 |
| 3350 | 1 0000057A | | RETURN |
| 3876 | 1100000A4A | 103900010500 | MOVE.B A.CID,D0 |
| 3877 | 1100000A50 | 4600 | NOT.B D0 |
| 3878 | 1100000A52 | 0200000F | AND.B #$F,D0 |
| 3879 | 1100000A56 | E318 | ROL.B #1,D0 |
| 3880 | 1100000A58 | 060000C0 | ADD.B #192,D0 |
| 3881 | 1100000A50 | 13C00003F8B0 | MOVE.B D0,A.ADSUP+6 |
| 3882 | 1100000A62 | 13C00003FD78 | MOVE.B D0,A.LXMIT+8 |
| 3883 | 1100000A68 | 41F9000003F8AA | LEA A.ADSUP,A0 |
| 3884 | 1100000A6E | | CALL DOLANCMD |

While the form of the invention shown and described herein is adapted to fulfill the objects previously stated, it is to be understood that it not intended to confine the invention to forms or embodiments disclosed herein for it is susceptible of the embodiment in various other forms within the scope of the appended claims.

We claim:

1. A data processing system for transmitting data between a host processor and a plurality of remote processing devices including:

a communication channel coupled between said host processor and each of the remote processing devices;

storage means coupled to said host processor for storing a plurality of sets of program instructions wherein each set controls the transmission of data between the host processor and one of said remote processing devices over said communication channel using a different communication protocol;

controller means mounted in each of the remote processing devices and coupled to said communication channel for controlling the transmission of data between the host processor and one of said remote processing devices;

manually settable switch means coupled to said controller means and manually settable during different periods of operation of the remote processing devices to one of a plurality of selected positions in which each selected position generates a different address data identifying the controller means; and processing means coupled to said controller means enabling said controller means to transmit the address data to said host processor whereby the host processor, using the address data as an address, will retrieve one of the sets of program instructions from the storage means and transmit the set of program instructions to the controller means for enabling the controller means to control the transmission of data between the host processor and the remote processing device in accordance with the program instructions.

2. The data processing system of claim 1 in which the identifying data comprises a plurality of binary signals.

3. The data processing system of claim 2 in which the identifying data comprises a four-bit binary word.

4. The data processing system of claim 3 in which the switching member comprises sixteen position hexadecimal rotary switch member.

5. The data processing system of claim 4 in which the rotary switch member is set to a position identifying the controller means.

6. The data processing system of claim 1 in which said storage means comprises a look-up table for storing a plurality of program instructions associated with a communication protocol which controls the transmission of data over said communication channel between the host processor and one of said remote processing devices through its associated controller means.

7. A data processing system for transmitting data between a host processing device and one of a plurality of remote terminal devices comprising:

a communication channel coupled between said host processing device and each of said remote terminal devices;

a look-up table coupled to said host processing device for storing a plurality of sets of program instructions, each set controlling the transmission of data between one of said remote terminal devices and said host processing device in accordance with a different communication protocol;

a controller mounted in each of said terminal devices and coupled to said communication channel for controlling the transmission of data between said one of said remote terminal devices and said host processing device over said communication channel, said controller including a processing member; and a manually operated hexadecimal rotary switch member mounted in said controller and coupled to said processing member, said switch member settable to one of a plurality of positions in which each position will output a plurality of different binary signals to said processing means for identifying the controller whereby said processing member transmits over the communication channel the identifying binary signals to said host processing device enabling the host processing device, using the identifying binary signals as an address, to retrieve from said look-up table a set of program instructions controlling the transmission of data between the host processing device and the remote processing terminal controlled by said controller, said host processing device transmitting the set of program instructions to said controller enabling the controller to control the transmission of data between the host processor and said one of said remote terminal devices.

8. A method for establishing the communication protocol for a data processing system which includes a host processor and a plurality of remote terminal devices comprising the steps of:

storing a plurality of sets of program instructions in a look-up memory in which each set of instructions represents a different communication protocol which controls the transmission of data between the host processor and a remote terminal device;

manually setting a hexadecimal rotary switching member mounted on a remote terminal device to one of a plurality of positions enabling the switching member to generate a plurality of binary signals representing the address of the selected remote terminal device in the data processing system;

addressing the look-up memory using the binary signals generated as an address to retrieve a predetermined set of program instructions representing a communication protocol from the memory for use by the selected remote terminal device; and transmitting the selected predetermined set of program instructions to the remote terminal device for controlling the transfer of data between the host processor and the selected remote terminal device.

* * * * *

UNITED STATES PATENT AND TRADEMARK OFFICE
CERTIFICATE OF CORRECTION

PATENT NO. : 4,787,028

DATED : November 22, 1988

INVENTOR(S) : Don C. Finfrock et al.

It is certified that error appears in the above-identified patent and that said Letters Patent is hereby corrected as shown below:

Column 10, line 36, after the word "comprises" insert --a--.

Column 12, line 21, delete "betwen" and substitute --between--.

Signed and Sealed this

Fourth Day of April, 1989

Attest:

Attesting Officer

DONALD J. QUIGG

Commissioner of Patents and Trademarks